United States Patent

Speer

[11] 4,260,439
[45] Apr. 7, 1981

[54] APPARATUS AND METHOD FOR REPAIRING PLASTIC MATERIALS

[75] Inventor: Lawrence L. Speer, Wadsworth, Ohio

[73] Assignee: Repair-It Industries, Inc., Barberton, Ohio

[21] Appl. No.: 9,346

[22] Filed: Feb. 5, 1979

[51] Int. Cl.³ .................. B32B 35/00; B29C 23/00
[52] U.S. Cl. .................... 156/98; 156/94; 156/256; 156/497; 156/499; 156/579; 219/227; 219/369; 219/380; 264/36; 427/140; 427/277; 427/348; 427/355; 427/371; 427/375; 427/378; 427/393.5; 428/63
[58] Field of Search .............. 156/94, 97, 98, 256, 156/497, 499, 529; 219/221, 227, 369, 385; 264/36; 427/140, 277, 348, 355, 371, 375, 378, 385 B; 428/63

[56] References Cited

U.S. PATENT DOCUMENTS

| | | | |
|---|---|---|---|
| 2,609,477 | 9/1952 | Borda et al. | 219/380 |
| 3,620,865 | 11/1971 | Golumbic | 156/98 |
| 3,713,926 | 1/1973 | Speer | 156/98 |
| 3,804,685 | 4/1974 | Jacoby et al. | 156/98 |
| 3,887,413 | 6/1975 | Speer | 156/94 |
| 4,086,113 | 4/1978 | Cataffo et al. | 156/98 |
| 4,181,547 | 1/1980 | Speer | 156/98 |

Primary Examiner—William A. Powell
Assistant Examiner—Robert A. Dawson
Attorney, Agent, or Firm—Wilson, Fraser, Barker & Clemens

[57] ABSTRACT

A method and apparatus for repairing plastic and vinyl materials utilizes a heat curable repair compound and a hand tool which supplies a narrow jet of heated air. The hot air tool receives air at a constant low pressure from a regulated air supply and includes an electrical heating element which heats the air passing through it to a temperature sufficient to cure the repair compound. Damage to plastic and vinyl materials can thus be repaired by trimming the damaged area, filling the trimmed area with the heat curable compound, heating the compound with the jet of air from the tool and finally, texturing the surface by the application of graining paper to the patch.

1 Claim, 5 Drawing Figures

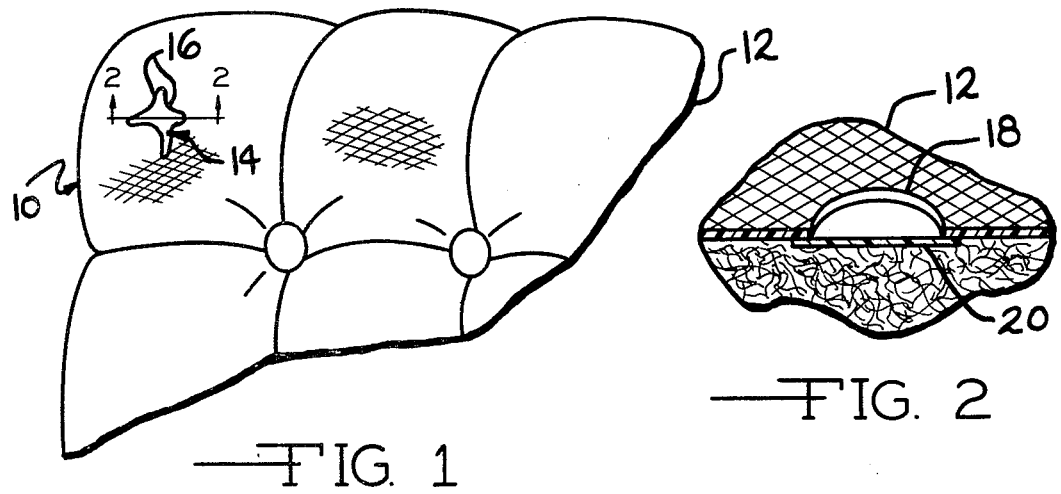
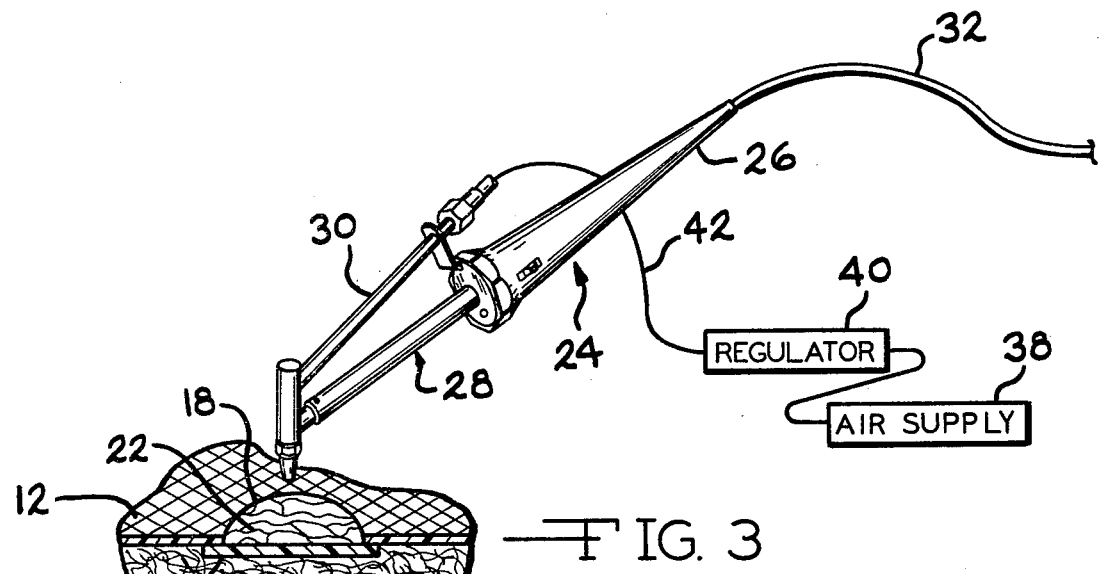
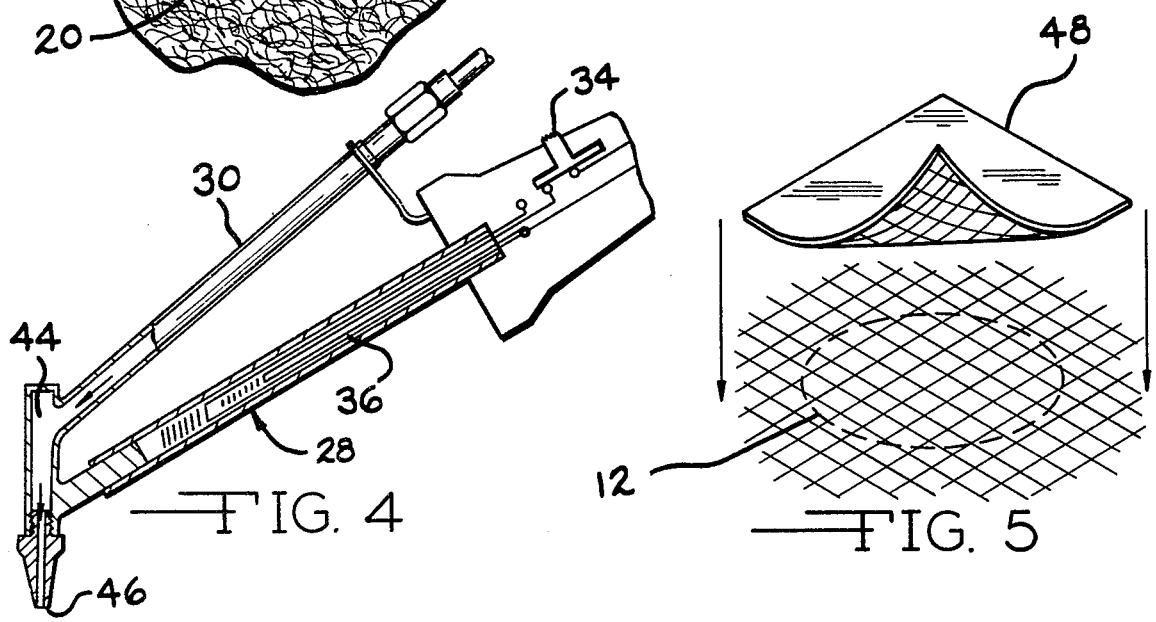

APPARATUS AND METHOD FOR REPAIRING PLASTIC MATERIALS

BACKGROUND OF THE INVENTION

The invention relates to a method and apparatus for repairing plastic and vinyl materials and more specifically to a method utilizing a heat curable compound and a hand tool which provides a narrow, accurately controllable heated jet of air to effect the curing of such compound.

Plastic and particularly vinyl material has become widely accepted as an upholstery material for furniture and automotive seats as well as a covering for luggage, purses and miscellaneous clothing articles such as boots. Among its advantages are its imperviousness to water, its ability to remain flexible over a broad range of temperatures and the variety of colors and finishes in which it is easily produced. By comparison to natural hide materials such as leather, vinyl materials exhibit highly uniform color and thickness which obviates the necessity of matching and piecing, are generally more tear resistent and cost substantially less.

Like any furniture or article covering, the plastic material will generally be used for an extended period of time and will eventually sustain damage. Pointed objects such as automobile keys and childrens toys or heated objects such as cigarettes are often the cause of such damage. Although the damage caused by such abuse is usually confined to a small area, it is often on an exposed, highly visible portion of the article. Most consumers have found it expensive and therefore impractical to replace the entire plastic panel containing the damaged area with new material.

In order to eliminate both the high cost of replacement and the unattractive damaged area itself, a number of in situ plastic repair procedures and devices have been developed. Typical of such consumer-oriented repair kits are those disclosed in my issued U.S. Pat. Nos. 3,713,926 and 3,887,413. Such kits include heat curable plastic or vinyl repair compounds which is placed in and cured in the damaged area by the application of heat.

A problem of such in situ repair kits can be generally characterized as the inexperience of the amateur (i.e., consumer) plastic fabric repairer. More specifically, this problem centers on the application of an appropriate quantum of heat energy which is sufficient to properly cure the patching compound, but which is not so great as to harm the surrounding, initially undamaged material. One solution to the problem of limiting the quantum of heat energy supply is disclosed in my copending U.S. Patent Application, Ser. No. 862,921, now U.S. Pat. No. 4,181,547. Repairs utilizing the process and apparatus described in this patent application are, however, preferably limited to those damaged areas which can be repaired with a single application of the tool.

Repair of large damaged areas or areas with highly irregular shapes remains a problem, inasmuch as is preferable to heat and cure the entire patch simultaneously. Although some attempts have been made to utilize heat guns of the type designed to cure heat-shrinkable tubing or for similar applications, they have generally been found to produce too large a quantity of heated air at too high a temperature, such that damage to the surrounding material results.

SUMMARY OF THE INVENTION

Plastic and vinyl material repair for both large or small and round or irregular areas can now be easily and professionally achieved through the utilization of the instant procedure and heat application tool.

The basic vinyl and plastic material repair process consists of the steps of trimming the damaged area in order to provide a generally smoothly curved opening having undamaged plastic about its periphery such that the material will provide uniform support for the path. The trimmed opening is then filled with a heat curable patching compound which preferably has been mixed to match the color of the damaged material. Large patches may require the addition of a backing paper which is placed behind the material which is being repaired.

Heat is then supplied with a novel tool which provides a heated jet of air at a temperature sufficiently high to cure the patching compound. The heating tool provides an easily controllable source of heat which may be directed to the area of the patch as needed. When the patching material has cured, graining paper may be applied to the patch to provide a surface texture to the patch which matches that of the surrounding, original plastic or vinyl material.

The tool is a hand held unit which comprises an electrical heating element and an air passageway having a heating chamber in thermal communication with the heating element. Air at a regulated low pressure, preferably about 1 p.s.i. or less, is supplied to the tool through a flexible hose and is heated in the chamber to a temperature sufficient to cure the plastic repair compound utilized during the repair procedure. The passageway and heating chamber terminate in a small orifice which directs a confined jet of heated air from the tool. Because of the excellent control of heat application made possible by a narrow air jet produced by the tool, repairs to plastic and vinyl materials can now be achieved rapidly and easily on both simple and major damage by professionals and amateurs alike.

It is thus an object of the instant invention to provide a method for repairing plastic materials utilizing a narrow jet of heated air.

It is a still further object of the instant invention to provide a method and apparatus for repairing damage in plastic materials which minimize the likelihood of damage to surrounding material.

It is a still further object of the instant invention to provide a method and apparatus for repairing damage in plastic materials whereby amateurs and professionals can readily produce repairs which are substantially indistinguishable from the original matieral.

Further objects and advantages of the instant invention will become apparent by reference to the following description and drawings.

BRIEF DESCRIPTION OF THE DRAWINGS

FIG. 1 is a fragmentary perspective view of a plastic fabric covered chair which has sustained damage;

FIG. 2 is a fragmentary, sectional perspective view of a trimmed, damaged area of the fabric illustrated in FIG. 1 taken along line 2—2 of FIG. 1;

FIG. 3 is a fragmentary perspective view of a damaged and trimmed area of the fabric illustrated in FIG. 1 during the repair procedure which also illustrates the air tool;

FIG. 4 is a full sectional, diagrammatic view of the air tool according to the instant invention; and FIG. 5 is a fragmentary perspective view illustrating the utilization of graining paper during the repair procedure.

DESCRIPTION OF THE PREFERRED EMBODIMENT

Referring now to FIG. 1, a chair 10 is illustrated which has been upholstered with a plastic or vinyl fabric material 12 and has sustained damage in an area 14. The damaged area 14 will typically have ragged and irregular edges 16. The first step of the repair procedure is to remove the irregular edges 16 and provide a generally smoothly curved opening 18 which is illustrated in FIG. 2. The trimming of the damaged area 14 is preferably performed with scissors or other cutting instrument. The opening 18 is made sufficiently large to encompass the entire damaged area 14 such that undamaged and undistorted vinyl material 12 forms the periphery of the opening 18. When the opening 18 corresponding to the damage is large, it has been found preferable to position a swatch of backing material 20 behind the opening 18. The backing material 20 is typically a close weave cheese cloth or other relatively porous material. When the opening 18 is relatively small, the backing material 20 may be omitted.

The next step of the repair procedure is illustrated in FIG. 3. A heat curable patching compound 22 is spread in a smooth layer within the opening 18. The patching compound 22 may be a mixture of a plurality of patching compounds carrying diverse color pigments which have been selected and mixed to match the color of the vinyl material 12. The chemical constitutents of the patching compound 22 may be, for example, polyvinyl chloride acetate (a finely divided resin) and a plasticizer such as diethylhexyl phthalate which, when combined, form a paste. The constitutents may be mixed into portions which vary over a wide range, although 70% polyvinyl acetate and 30% plasticizer by volume are recommended. The curing of the patching compound 22 is achieved by the application of heat from a heat tool 24.

Referring now to FIGS. 3 and 4, the heat tool 24 comprises a thermally and electrically insulated handle 26 to which a heating element assembly 28 and air supply tube 30 are secured. Electricity is supplied to the heat tool 24 through a line cord 32 and to a three position switch 34. The switch 34 supplies electrical energy to either one or both of two heating elements 36 and provides adjustment of the heat output of the heat tool 24. More precise adjustment of the heat output of the heat tool 24 may be achieved by the addition of an SCR or variable autotransformer type power supply (not shown) to adjust the voltage applied to the heating elements 36. Those skilled in the art of electric heat control will readily understand the structure and operation of such equipment and thus it will not be further described.

Air is supplied to the air tube 30 from an air supply 38 which may be a conventional compressor, compressed air tank or other means, through a regulator 40 and into a flexible hose 42. The regulator 40 is preferably adjusted to provide approximately 1 p.s.i. air pressure to the heat tool 24. Air supplied to the heat tool 24 passes through the air supply tube 30 and into a heating chamber 44. The heating chamber 44 is in thermal communication with the heating elements 36 and raises the temperature of the air therein to between 350° and 400° Fahrenheit. The exact temperature of the delivered air necessary to effect curing of the patching compound will, of course, vary with the composition of the compound as noted previously, however, it should be at least as high as the curing temperature of such compound. Air exits the heat tool 24 and more specifically the heat chamber 44 through a small orifice 46. The orifice 46 has a diameter of approximately 0.060 inches. This diameter has been found preferable for all general purpose repair work. However, it may be varied over a somewhat narrow range depending on the specific application of the heat tool 24.

Referring again to FIG. 3, heated air from the heat tool 24 is directed uniformly over the area of the opening 18 filled with the patching compound 22 until it is fully heat cured. The heat tool 24 not only allows precise control of the application of heat by virtue of the very narrow jet of heated air which issues from the orifice 46 of the heat tool 24, but also allows the repairer to visually monitor both the application of heat to the patching material 22 and the ongoing curing process of the material. The narrowness of the jet of air issuing from the tool 24 substantially eliminates damage to the surrounding material 12 due to the uncontrolled and/or excessive application of heat which has plagued all prior art forced hot air repair methods.

Referring now to FIG. 5, when the patching compound 22 has cured, it is desirable to texture the surface of the cured patching material 22 to resemble that of the vinyl vinyl material 12. To achieve this surface texture, a sheet of metallic or paper graining material 48 is placed over and momentarily pressed against the patching material 22. Whereas, conventional paper graining material with an embossed pattern has been widely used, it has been found preferable to utilize metallic graining material 48 due to the substantially higher specific heat of any metal relative to paper. The rapid transfer of heat energy from the patching compound 22 to the metallic graining material 48 shocks the patching compound 22 and rapidly textures the surface of the patching compound 22, completing the repair procedure. Metallic graining material 48 also exhibits substantially improved service life. Whereas paper graining material tends to become smooth after repeated use, the texture of metallic graining material 48 does not deteriorate. The removal of the graining material 48 completes the repair procedure. The optional final steps of waxing and buffing the repaired area may be necessary to duplicate the high gloss of the vinyl material 12.

The foregoing disclosure is the best mode devised by the inventor for practicing this invention. It is apparent, however, that methods and devices incorporating modifications and variations to the instant invention will be obvious to those skilled in the art of vinyl repair. Inasmuch as the foregoing disclosure is intended to enable those skilled in the pertinent art to practice the invention, it should not be construed to be limited thereby but should be construed to include such obvious variations and be limited only by the spirit and scope of the following claims.

I claim:

1. A method of repairing plastic material comprising the steps of:

trimming away damaged plastic material to form a patch area, providing a heat curable plastic patching compound, substantially filling said patch area of such plastic material with such patching compound in one application, providing a flow of air at approximately one psi to a heating tool, heating such air in such tool to a temperature sufficient to cure such patching compound, exhausting such air from such tool through an orifice having a diameter of less than 0.1 inches, and directing such heated air to such patching compound until such compound has substantially cured.

* * * * *